United States Patent
Charbon

(10) Patent No.: US 10,501,818 B2
(45) Date of Patent: Dec. 10, 2019

(54) METHOD FOR IMPROVING AN IRON-NICKEL-CHROMIUM-MANGANESE ALLOY FOR TIMEPIECE APPLICATIONS

(71) Applicant: Nivarox-FAR S.A., Le Locle (CH)

(72) Inventor: Christian Charbon, Chezard-St-Martin (CH)

(73) Assignee: Nivarox-FAR S.A., Le Locle (CH)

(*) Notice: Subject to any disclaimer, the term of this patent is extended or adjusted under 35 U.S.C. 154(b) by 553 days.

(21) Appl. No.: 15/244,594

(22) Filed: Aug. 23, 2016

(65) Prior Publication Data

US 2017/0159144 A1   Jun. 8, 2017

(30) Foreign Application Priority Data

Dec. 2, 2015 (EP) .................................. 15197408

(51) Int. Cl.

| | |
|---|---|
| *C21D 6/00* | (2006.01) |
| *C21D 9/02* | (2006.01) |
| *B22D 7/00* | (2006.01) |
| *C21D 1/18* | (2006.01) |
| *C21D 9/00* | (2006.01) |
| *C22C 38/00* | (2006.01) |
| *C22C 38/42* | (2006.01) |
| *C22C 38/44* | (2006.01) |
| *C22C 38/58* | (2006.01) |
| *G04B 17/06* | (2006.01) |
| *C22C 38/04* | (2006.01) |
| *C22C 38/38* | (2006.01) |
| *F16F 1/02* | (2006.01) |
| *C22C 22/00* | (2006.01) |
| *C22C 27/06* | (2006.01) |
| *C22C 33/04* | (2006.01) |
| *C22C 33/06* | (2006.01) |
| *G04B 17/22* | (2006.01) |

(52) U.S. Cl.
CPC ................ *C21D 9/02* (2013.01); *B22D 7/00* (2013.01); *C21D 1/18* (2013.01); *C21D 9/0081* (2013.01); *C22C 22/00* (2013.01); *C22C 27/06* (2013.01); *C22C 33/04* (2013.01); *C22C 33/06* (2013.01); *C22C 38/001* (2013.01); *C22C 38/04* (2013.01); *C22C 38/38* (2013.01); *C22C 38/42* (2013.01); *C22C 38/44* (2013.01); *C22C 38/58* (2013.01); *F16F 1/021* (2013.01); *G04B 17/063* (2013.01); *G04B 17/066* (2013.01); *G04B 17/22* (2013.01)

(58) Field of Classification Search
CPC .......... C21D 9/02; C21D 9/0081; C21D 1/18; C22C 33/04; C22C 33/06; C22C 22/00; C22C 27/06; C22C 38/001; C22C 38/38; C22C 38/42; C22C 38/04; C22C 38/44; C22C 38/58; B22D 7/00; F16F 1/021; G04B 17/066; G04B 17/063
See application file for complete search history.

(56) References Cited

U.S. PATENT DOCUMENTS

| | | | |
|---|---|---|---|
| 3,735,971 A | 5/1973 | Steinemann | |
| 5,343,492 A * | 8/1994 | Henn | .................... F27B 14/061 266/240 |
| 2016/0124391 A1* | 5/2016 | Charbon | ................. C22C 38/58 420/45 |

FOREIGN PATENT DOCUMENTS

| | | |
|---|---|---|
| CH | 703 796 B1 | 3/2012 |
| DE | 196 07 828 A1 | 10/1996 |
| EP | 1 795 619 A2 | 6/2007 |
| EP | 2 924 514 A1 | 9/2015 |
| WO | WO-2014198466 A2 * | 12/2014 ............. C22C 38/58 |

OTHER PUBLICATIONS

European Search Report with written opinion dated May 23, 2016 in European application 15197408.6 filed on Dec. 2, 2015 (with English Translation of Categories of Cited Documents).

* cited by examiner

*Primary Examiner* — Haytham Soliman
(74) *Attorney, Agent, or Firm* — Oblon, McClelland, Maier & Neustadt, L.L.P.

(57) ABSTRACT

A method for improving an iron-nickel-chromium-manganese alloy for timepiece applications, particularly for producing a balance spring, is described. The base alloy contains, by mass, from 9.0% to 13.0% of nickel, from 4.0% to 12.0% of chromium, from 21.0% to 25.0% of manganese, from 0 to 5.0% of molybdenum, and/or from 0 to 5.0% of copper in addition to iron. The alloy is hardened while its anti-ferromagnetic properties are maintained by introducing 0.10% to 1.20% of carbon and 0.10% to 1.20% of nitrogen interstitially, based on the mass of the base alloy.

10 Claims, No Drawings

METHOD FOR IMPROVING AN IRON-NICKEL-CHROMIUM-MANGANESE ALLOY FOR TIMEPIECE APPLICATIONS

This application claims priority from European Patent Application No 15197408.6 of Dec. 2, 2015, the entire disclosure of which is hereby incorporated herein by reference.

FIELD OF THE INVENTION

The invention relates to a method for improving an iron-nickel-chromium-manganese alloy for timepiece applications.

The invention also relates to the use of such an alloy for the production of a balance spring.

BACKGROUND OF THE INVENTION

Thermal compensator alloys used for timepiece balance springs are for the large part the product of the work of Charles-Edouard Guillaume and based on Fe—Ni—Cr Elinvar. Hardening elements have, since, been added: W+C, or Ti+Al, or Be, or Nb, which have in particular given birth to the alloys "Elinvar", "Ni-Span", "Nivarox", "Isoval".

All these alloys, which are suitable for application because of their mechanical properties, are however ferromagnetic, and therefore sensitive to magnetic fields, which is prejudicial to the functioning of a watch.

In the years 1970-1990, works on anti-ferromagnetic alloys were published but did not give rise to industrial developments. These alloys are almost insensitive to the effect of a magnetic field but have some industrial problems and the arrival of a clockmaking crisis in the 1980s stopped developments.

The document EP2924514 in the name of NIVAROX SA describes a timepiece spring or jewellery produced in a stainless steel alloy comprising a base formed from iron and chromium, arranged according to an austenitic face-centred cubic structure, and comprising manganese and nitrogen, and the composition of which spring by mass is:
chromium: minimum value 15%, maximum value 25%;
manganese: minimum value 5%, maximum value 25%;
nitrogen: minimum value 0.10%, maximum value 0.90%;
carbon: minimum value 0.10%, maximum value 1.00%;
with the total (C+N) of the values by mass of the carbon and nitrogen as a proportion of the total between 0.40% and 1.50%;
with the ratio (C/N) of the content by mass of the carbon as a proportion of the total relative to that of nitrogen between 0.125 and 0.550;
impurities and other metals with the exception of iron; minimum value 0%, maximum value 12.0%;
iron: the complement to 100%.

SUMMARY OF THE INVENTION

There is known, in particular from the work of Dr. Ing. Manfred Muller, a family of anti-ferromagnetic alloys of particular interest, of the Fe—Mn—Ni—Cr type.

It is possible to harden such alloys by the addition of Be or by the addition of Ti+Al.

Be is not desirable because of its toxicity. And the addition of Ti+Al is difficult because Ti+Al react with the Ni present in the alloy, and by modifying the composition locally, making it thereby difficult to control the thermal coefficient of the alloy; furthermore, structural hardening by precipitation of $Ni_3Al$ and $Ti_3Al$ tends to reduce the ductility of the alloy.

The object of the invention is to find an alternative which allows satisfactory hardening.

To this end, the invention relates to a method for improving an iron-nickel-chromium-manganese-alloy for timepiece applications, according to claim 1.

In summary, the present invention makes it possible to harden an alloy of the Fe—Mn—Ni—Cr type, by introduction of carbon and nitrogen interstitially, according to the principle of HIS steels.

Such hardening by C+N makes possible the development of alloys comprising good mechanical properties, which are anti-ferromagnetic and ecological.

The invention also relates to the use of such an alloy for production of a timepiece balance spring.

DETAILED DESCRIPTION OF THE PREFERRED EMBODIMENTS

The invention relates to a method for improving an iron-nickel-chromium-manganese alloy for timepiece applications.

According to the invention, a base alloy is chosen and produced, comprising by mass:
from 4.0% to 13.0% of nickel,
from 4.0% to 12.0% of chromium,
from 21.0% to 25.0% of manganese,
from 0 to 5.0% of molybdenum and/or from 0 to 5.0% of copper,
the complement in iron,
and hardening of this alloy is effected whilst maintaining its anti-ferromagnetic properties, by introduction of carbon and of nitrogen interstitially with, by proportion of mass of the base alloy:
from 0.10% to 1.20% of carbon, and/or
from 0.10% to 1.20% of nitrogen.

The proportion of chromium is therefore very much less than that of document EP2924514 cited earlier.

More particularly, this introduction of carbon and nitrogen is adjusted, such that the sum of the proportions, by mass of the base alloy, of the carbon and of the nitrogen, is between 0.60% and 0.95%.

More particularly, this introduction of carbon and nitrogen is adjusted, such that the sum of the proportions, by mass of the base alloy, of the carbon and of the nitrogen, is between 0.75% and 0.95%.

More particularly, this introduction of carbon and nitrogen is adjusted, such that the sum of the proportions, by mass of the base alloy, of the carbon and of the nitrogen, is between 0.80% and 0.85%.

More particularly, this introduction of carbon and nitrogen is adjusted, such that the ratio of the percentages of carbon and of nitrogen, by total mass of the base alloy, is between 0.5 and 2.0.

More particularly, this introduction of carbon and nitrogen is adjusted, such that the ratio of the percentages of carbon and of nitrogen, by total mass of the base alloy, is between 1.0 and 1.5.

More particularly, this base alloy is chosen comprising, by mass, at least 8.0% of chromium.

More particularly, there is incorporated in the base alloy, as a proportion of the mass of the base alloy, between 0.5% and 5.0% of molybdenum and/or of copper in order to improve its resistance to corrosion.

More particularly the base alloy is chosen and produced, comprising by mass:
    from 4.0% to 13.0% of nickel,
    from 4.0% to 12.0% of chromium,
    from 21.0% to 25.0% of manganese,
    from 0 to 5.0% of molybdenum and/or from 0 to 5.0% of copper,
    the complement in iron.

More particularly, ferrochromium is added to the nitrogen in order to arrive at the correct chemical composition.

More particularly, ferromanganese is added to the carbon in order to arrive at the correct chemical composition.

More particularly, ferrochromium is added to the nitrogen, and ferromanganese to the carbon in order to arrive at the correct chemical composition.

More particularly, production of this alloy includes a casting process, comprising the following steps:
    preparing, in adequate proportions, on the one hand, pure metals, nickel, chromium, iron and, on the other hand, pre-alloys of the type:
low carbon ferrochromium, termed Nitrided Low Carbon Ferro Chromium, with 65% of chromium, 3% of nitrogen, the remainder in iron,
high carbon ferromanganese, termed High Carbon Ferro Manganese, with 75% of manganese, 7% of carbon, the remainder in iron,
low carbon ferromanganese, termed Low Carbon Ferro Manganese, with 95% of manganese, the remainder in iron,
    in a vacuum induction furnace, melting, under nitrogen partial pressure, iron, nickel and chromium,
    adding the low carbon ferromanganese and the high carbon ferromanganese,
    controlling the temperature and maintaining it at approx. 20° C. above the liquidus of the alloy, or at at least 20° C. above the liquidus of the alloy,
    adding the ferrochromium to the low carbon nitrogen, which is the main source of nitrogen,
    controlling the temperature and maintaining it at approx. 20° C. above the liquidus of the alloy, or at at least 20° C. above the liquidus of the alloy,
    implementing the casting of the ingot.

The invention also relates to the use of such an alloy for producing a timepiece balance spring, in particular a balance spring for an oscillator.

What is claimed is:

1. A method for hardening an iron-nickel-chromium-manganese base alloy, the method comprising:
    introducing, based on the base alloy, 0.10% to 1.20% by mass of carbon and 0.10% to 1.20% by mass of nitrogen interstitially into the base alloy with a mass ratio of carbon to nitrogen ranging from 1.0 to 2.0 so as to harden the base alloy and maintain anti-ferromagnetic properties of the base alloy,
    wherein the base alloy comprises, by mass:
    from 4.0% to 13.0% of nickel,
    from 4.0% to 12.0% of chromium,
    from 21.0% to 25.0% of manganese,
    from 0 to 5.0% of molybdenum and/or from 0 to 5.0% of copper, and
    iron.

2. The method according to claim 1, wherein a sum of the introduced carbon and nitrogen ranges between 0.60% and 0.95%.

3. The method according to claim 2, wherein the sum of the introduced carbon and nitrogen ranges between 0.75% and 0.95%.

4. The method according to claim 3, wherein the sum of the introduced carbon and nitrogen ranges between 0.80% and 0.85%.

5. The method according to claim 1, wherein said base alloy comprises at least 8.0% of chromium.

6. The method according to claim 1, wherein said base alloy comprises, by mass: from 0.5% to 5.0% of molybdenum and/or copper.

7. The method according to claim 1, wherein ferrochromium is added to nitrogen.

8. The method according to claim 1, wherein ferromanganese is added to carbon.

9. The method according to claim 1, wherein ferrochromium is added to nitrogen, and ferromanganese is added to carbon.

10. A timepiece balance spring, comprising:
    an alloy produced by the method according to claim 1.

* * * * *